Figure 2:
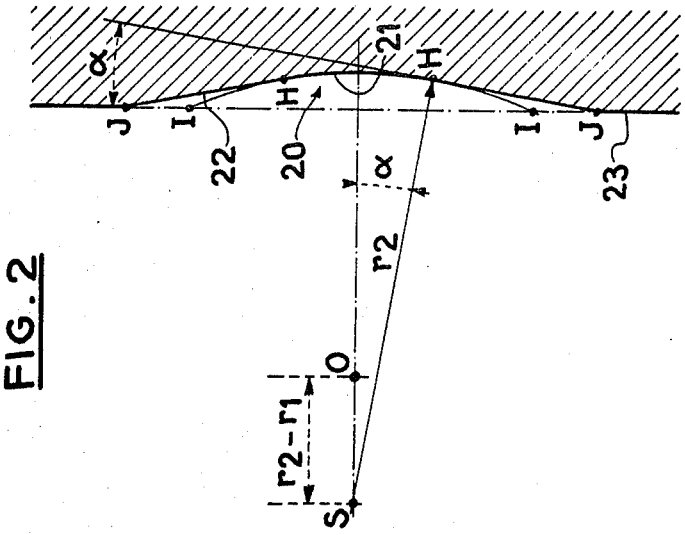

United States Patent [19]

Alexandre

[11] 4,255,945

[45] Mar. 17, 1981

[54] TRIPOD HOMOKINETIC JOINTS WHICH HAVE AXIAL RETAINING MEANS

[75] Inventor: Orain M. Alexandre, Conflans Ste Honorine, France

[73] Assignee: Glaenzer Spicer, Poissy, France

[21] Appl. No.: 19,619

[22] Filed: Mar. 12, 1979

[30] Foreign Application Priority Data

Mar. 22, 1978 [FR] France .............................. 78 08331

[51] Int. Cl.³ .............................................. F16D 3/30
[52] U.S. Cl. ............................................ 64/21; 64/8
[58] Field of Search ................................ 64/21, 7, 8

[56] References Cited

U.S. PATENT DOCUMENTS

| | | | |
|---|---|---|---|
| 3,757,534 | 9/1973 | Orain | 64/8 |
| 3,792,598 | 2/1974 | Orain | 64/8 |
| 3,818,721 | 6/1974 | Wahlmark | 64/21 |
| 3,877,251 | 4/1975 | Wahlmark | 64/21 |
| 4,192,154 | 3/1980 | Nakamura et al. | 64/21 |
| 4,205,539 | 6/1980 | Orain | 64/21 |

*Primary Examiner*—Henry K. Artis
*Attorney, Agent, or Firm*—Schuyler, Banner, Birch, McKie & Beckett

[57] ABSTRACT

The object of the invention is to improve the performance over a period of time and ensure a constant pre-stressing force of the axial retaining device for a tripod homokinetic joint. For this purpose, surfaces carried by the tulip member, which act as bearing surfaces for part-spherical surfaces carried by the tripod of the joint, comprise recesses of concave shape and of a radius of curvature which is slightly larger than the radius of curvature of the part-spherical bearing surfaces carried by the tripod.

4 Claims, 2 Drawing Figures

TRIPOD HOMOKINETIC JOINTS WHICH HAVE AXIAL RETAINING MEANS

DESCRIPTION

The present invention relates to homokinetic joints having a wide operating angle of the tripod type, in particular for driving steering and driving wheels of automobile vehicles.

It is known that such joints comprise a member in the form of a tripod which is connected to one of the shafts to be interconnected and defines three trunnions on which are rotatably and slidably mounted part-spherical rollers which are received in raceways defined in a second member termed a tulip member connected to the other of the two shafts. These joints are completed by an internal axial retaining device comprising a part-spherical surface carried by the tripod and guided between two parallel planar surfaces carried by the member in the shape of a tulip. The two planar surfaces are perpendicular to the general axis of the tulip member and are usually formed, one, on the bottom of the tulip member and, the other, on a centre part of an elastically yieldable fastener fixed to the tulip member.

The aforementioned part-spherical surface defines two part-spherical zones having a radius $r_1$ and respectively bearing against the planar surfaces under the effect of a pre-stressing force Q exerted along the general axis of the tulip member and thereby producing contact pressures which, according to calculations are maximum at the centre of the area of contact where they reach a value which is determined by the following general formula:

$$P_o = 0.6 \left[ \frac{QE}{2} \left( \frac{1}{r_1} - \frac{1}{r_2} \right)^2 \right]^{\frac{1}{3}}$$

where:

Q represents the value of the axial pre-stressing force;
E is the modulus of elasticity of the steels from which the parts are made;
$r_1$ is the radius of the two part-spherical zones;
$r_2$ designates the radius of the surface acting as a support seat for said part-spherical zones.

It will be understood that when these seats are planar as in the prior art, the radius $r_2$ is infinite and:

$$P_o = 0.6 \left[ \frac{\frac{QE}{2}}{2 r_1} \right]^{\frac{1}{3}}$$

When the joint is placed in a position in which the two shafts connected thereby make an angle therebetween, for example an angle δ, the centre O of the tripod may move radially while it is immobilized along the axis of the tulip member, by a value λ:

λ = R/2 (1 − cos δ)

Usually, the maximum angle of operation of these joints exceeds 40°. However, for 99% of the distance travelled through, this angle remains less than 12°. Consequently, the contact friction under load Q is concentrated in a reduced area of the planar bearing surfaces. Moreover, this load at a given moment is concentrated in a surface of contact which is very small and corresponds therefore to a high pressure $P_o$. There is consequently an appreciable wear of the four surfaces of contact and mainly of the planar surfaces since this wear is localized around the general axis of the tulip member and not distributed as in the case of the part-spherical surfaces of the tripod. This wear results in a reduction in the value of the pre-stressing which may be as much as to destroy the effectiveness of the axial retaining device and produce undesirable noise or vibration when the joint operates under torque and at an angle.

An object of the present invention is to overcome this drawback and to avoid this phenomenon of wear and reduction in the pre-stressing force, without however increasing the cost of the joint or complicating the manufacturing operations or hindering or reducing the angular movement of the joint and its other performances.

According to the invention, this result is obtained in a homokinetic joint of the tripod type comprising an axial retaining device including two part-spherical surfaces carried by the tripod and bearing against adjacent surfaces carried by the tulip member, wherein the bearing surfaces carried by the tulip member comprise in the centre zones thereof recesses of concave shape whose radii of curvature are slightly larger than those of the part-spherical surfaces carried by the tripod.

Preferably, said recesses comprise a concave part-spherical centre zone and a frustoconical annular zone connecting the concave centre zone to a planar part of the bearing surfaces.

As will be explained in more detail hereinafter, owing to these features the pressure of contact $P_o$ is reduced while the value of the pre-stressing force Q is increased, these two effects being complementary so as to ensure a complete reliability of the axial retainment which remains without play throughout the useful life of the joint.

Figure 1:
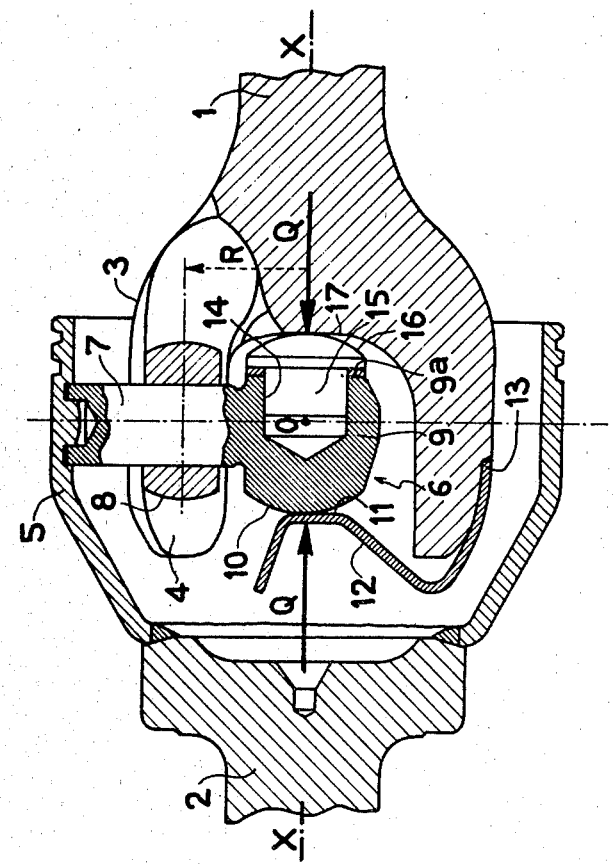

The invention will now be described in more detail with respect to an embodiment which is chosen merely by way of example and shown in the accompanying drawing in which:

FIG. 1 is a longitudinal sectional view of a homokinetic joint of the tripod type, and FIG. 2 is a sectional view, to an enlarged scale, of the shape given to one of the bearing surfaces carried by the tulip member.

FIG. 1 shows a homokinetic joint interconnecting a shaft 1 and a shaft 2, the first of which may be driven by an engine-drive unit of an automobile vehicle, whereas the second shaft may be connected to a wheel stub-axle. The shaft 1 carries a tulip member 3 defining three raceways 4 of part-circular cross-sectional shape. The shaft 2 carries a bell or cup member 5 which is rigid with a tripod 6 defining three trunnions 7 on which are rotatably and slidably mounted part-spherical rollers 8 which are received in the raceways of the tulip member. The hub 9 of the tripod defines a first part-spherical surface 10 which bears against the centre portion 11 of an elastically yieldable fastener 12 which is hooked, in the known manner, at 13 on the branches of the tulip member. The hub 9 moreover defines an axial cavity 14 in which a thrust member 15 is received. This member 15 is in the shape of a mushroom which defines on its outer surface a second part-spherical surface 16 whose radius of curvature is preferably equal to the radius of curvature of the first surface 10 and abuts against the inner end or bottom 17 of the tulip member. A ring 18 of elastically yieldable material is interposed between the thrust member 15 and the adjacent face 9a of the hub of the tripod. In such an arrangement, which on the whole is known per se, a pre-stressing force Q exerted in the direction of axis X—X of the tulip member exists between the part-spherical surfaces carried by the tripod and the bearing surfaces therefore carried by the tulip member.

According to the invention and as can be seen in FIG. 2, each bearing surface 11 and 17 comprises a recess 20 of concave shape. In the illustrated embodiment, this recess is formed by a first zone 21 in the shape of a part-spherical dome centered on the axis of the tulip member at a point S and having a radius $r_2$ which is slightly larger than the radius $r_1$ of the adjacent surface. This part-spherical dome subtends an angle at the centre $\alpha$ which is of the order of a few degrees, for example 3° or 4°. Provided around the part-spherical dome 21 is a frustoconical zone 22 which connects the dome to the adjacent planar surface 23. This frustoconical zone 22 is tangent to the dome and subtends an angle at the centre which is therefore equal to the angle $\alpha$, this angle having been exagerrated in the drawing in order to render the latter more clear. In the drawing, O represents the centre of the part-spherical surfaces carried by the tripod; S represents the centre of the concave part-spherical seat provided on the inner end of the tulip member, a symmetrical seat being of course provided on the elastically yieldable fastener 17. The distance OS is equal to $r_2-r_1$; I represents a theoretical point of intersection of the part-spherical seat with the plane 23; H represents the point of tangency of the connecting cone with the part-spherical seat and J the point of intersection of this cone with the plane 23. Indeed, the angle of intersection of HJ with the plane does not exceed 3° or 4° and therefore remains quite unnoticeable in practice.

Note that the such concave seats can be produced with a very high precision and practically without difficulty in mass production at the same time as the cold forming of these two members, owing to a slight modification in the shape of the shaping punch as concerns the tulip member and of the stamping punch as concerns the fastener. Indeed, it is sufficient to machine these two tools in such manner that they have a boss of a shape which is complementary to that of the recess desired to be obtained bearing in mind the elastic return of the material which occurs when cold forming.

With the arrangement according to the invention, there is obtained a reduction in the pressure of contact while the force applied in the region of the surfaces of contact is increased without hindering the movement of the joint, that is to say while conserving the possibility of the radial displacement of the centre of the part-spherical dome between the bearing surfaces, since the depth of the concave seat is very small and practically unnoticeable, bearing in mind the very small subtended angle of the order of 3° or 4° for a radius of the sphere of 20 mm. Under these conditions, the depth of the recess does not exceed 0.05 mm and the diameter is of the order of 2.5 to 3 mm.

The comparison with a device of the prior art is as follows:

known spherical surface-planar surface assembly: $r_1 = 15.25$ mm, $r_2 = $ infinity;

proposed spherical surface-concave seat assembly: $r_1 = 15.25$ mm, $r_2 = 20$ mm.

If the pressure $P_o$ in the region of the surfaces in contact is assumed to be equal, in the arrangement according to the invention it is possible to apply a pre-stressing force of:

$$Q_1 = Q_o \times \frac{1}{(1 - \frac{r_1}{r_2})^2} \simeq 18\, Q_o$$

As such a pre-stressing force is not necessary, it is advantageous to choose $Q_1 = 2\, Q_o$ which results in a considerable reduction in the pressure of contact with respect to the reference pressure $P_o$.

The bearing surfaces are thus much less stressed and this ensures that the axial pre-stressing force is maintained throughout the operating life of the joint.

Having now described our invention what we claim as new and desire to secure by Letters Patent is:

1. A tripod homokinetic joint comprising a member in the form of a tripod for connection to one of two shafts to be interconnected and defining three trunnions, part-spherical rollers respectively rotatably and slidably mounted on the trunnions, a second member termes a tulip member for connection to the other of said two shafts and defining raceways in which the rollers are respectively mounted, means defining bearing surfaces carried by the tulip member, an axial retaining device comprising means defining two part-spherical surfaces carried by the tripod and bearing against the adjacent bearing surfaces carried by the tulip member, the bearing surfaces carried by the tulip member having in centre zones thereof recesses of concave shape having radii of curvature which are slightly larger than radii of curvature of the part-spherical surfaces carried by the tripod.

2. A joint as claimed in claim 1, wherein said recesses have a concave part-spherical centre zone and a frustoconical annular zone which connects the centre zone to a planar portion of the bearing surfaces.

3. A joint as claimed in claim 2, wherein said concave part-spherical zone subtends an angle at the centre which is in the order of (3) three or (4) four degrees.

4. A joint as claimed in claim 2, wherein the frustoconical annular zone is tangent to the part-spherical zone.

* * * * *